United States Patent
Michel et al.

(10) Patent No.: US 12,447,938 B2
(45) Date of Patent: Oct. 21, 2025

(54) METHOD FOR EVALUATING WHEEL SENSOR SIGNALS, ASSEMBLY FOR SAID METHOD, AND BRAKE SYSTEM COMPRISING SAID ASSEMBLY

(71) Applicant: Continental Automotive Technologies GmbH, Hannover (DE)

(72) Inventors: Frank Michel, Rosbach v.d. Höhe (DE); Micha Heinz, Darmstadt (DE)

(73) Assignee: Continental Automotive Technologies GmbH, Hannover (DE)

( * ) Notice: Subject to any disclaimer, the term of this patent is extended or adjusted under 35 U.S.C. 154(b) by 34 days.

(21) Appl. No.: 18/704,572

(22) PCT Filed: Apr. 28, 2022

(86) PCT No.: PCT/DE2022/200079
§ 371 (c)(1),
(2) Date: Apr. 25, 2024

(87) PCT Pub. No.: WO2023/078510
PCT Pub. Date: May 11, 2023

(65) Prior Publication Data
US 2024/0409071 A1    Dec. 12, 2024

(30) Foreign Application Priority Data
Nov. 2, 2021 (DE) .................. 10 2021 212 324.4

(51) Int. Cl.
*B60T 8/171* (2006.01)
*B60T 8/172* (2006.01)
(Continued)

(52) U.S. Cl.
CPC ........... *B60T 8/171* (2013.01); *B60T 8/1725* (2013.01); *B60W 10/18* (2013.01); *H04L 67/12* (2013.01);
(Continued)

(58) Field of Classification Search
CPC ..... B60C 23/061; B60T 8/171; B60T 8/1725; B60W 10/18; B60W 2420/503;
(Continued)

(56) References Cited

U.S. PATENT DOCUMENTS 6,019,086 A * 2/2000 Schneider ................ G01D 3/08
123/406.61
6,687,644 B1 * 2/2004 Zinke ...................... B60T 8/171
73/488
(Continued)

FOREIGN PATENT DOCUMENTS

CN    211179883 U    8/2020
DE    19650935 A1    6/1998
(Continued)

OTHER PUBLICATIONS

Search Report dated Jul. 4, 2022 from corresponding German patent application No. 10 2021 212 324.4.
(Continued)

*Primary Examiner* — Carl C Staubach

(57) ABSTRACT

A method is provided for evaluating wheel sensor signals of a wheel speed sensor where the wheel speed sensor supplies signals that are transmitted using two different protocols. Each protocol comprises a start pulse and a number of data pulses. A first processor unit receives the signals from the sensor and uses the start pulse to determine whether they were transmitted using the first protocol or the second protocol. Depending on the result, the first processor unit signals without a time delay whether a start pulse has been received via an ASO interface of a second processor unit, wherein a variable pulse width is used to indicate whether the start pulse belongs to a data packet that is transmitted with the first protocol or with the second protocol. The
(Continued)

second processor provides each incoming ASO signal with a time stamp, so that the speed can be determined.

10 Claims, 4 Drawing Sheets

(51) Int. Cl.
    *B60W 10/18*     (2012.01)
    *H04L 67/12*     (2022.01)

(52) U.S. Cl.
    CPC ... *B60W 2420/503* (2013.01); *B60W 2520/28* (2013.01)

(58) Field of Classification Search
    CPC ..... B60W 2520/28; G01P 3/487; G01P 3/489; H04L 67/12; H04W 4/38; H04W 4/48
    See application file for complete search history.

(56) References Cited

U.S. PATENT DOCUMENTS

| | | | |
|---|---|---|---|
| 10,794,927 B2* | 10/2020 | Tepass | G01P 3/489 |
| 12,107,672 B1* | 10/2024 | Hui | H04J 3/0667 |
| 2005/0179429 A1* | 8/2005 | Lohberg | G01P 3/489 |
| | | | 324/207.13 |
| 2016/0218711 A1* | 7/2016 | Grambichler | G01P 3/44 |
| 2016/0231141 A1* | 8/2016 | Endres | G01D 5/24466 |
| 2017/0059359 A1* | 3/2017 | Kawasaki | G01P 13/045 |
| 2017/0219662 A1* | 8/2017 | Prentice | H03K 7/08 |
| 2017/0336225 A1* | 11/2017 | Burdette | G01P 3/487 |
| 2018/0174441 A1* | 6/2018 | Hainz | G08C 19/16 |
| 2018/0210004 A1* | 7/2018 | Tepass | G01D 5/145 |
| 2018/0283905 A1* | 10/2018 | Werth | G01P 3/489 |
| 2019/0353677 A1* | 11/2019 | Lim | G01P 13/045 |
| 2020/0081074 A1* | 3/2020 | Fontanesi | B60T 8/171 |
| 2020/0088550 A1* | 3/2020 | Lorber | G01R 33/0029 |
| 2021/0356489 A1* | 11/2021 | Fontanesi | G01P 21/00 |
| 2023/0054830 A1* | 2/2023 | Lorber | G01R 33/072 |
| 2023/0400477 A1* | 12/2023 | Friedrich | H04L 67/12 |

FOREIGN PATENT DOCUMENTS

| | | |
|---|---|---|
| DE | 102015213572 A1 | 1/2017 |
| DE | 102017107228 A1 | 10/2018 |
| DE | 102018121998 A1 | 3/2020 |
| DE | 102018215938 A1 | 3/2020 |

OTHER PUBLICATIONS

International Search Report and Written Opinion dated Aug. 1, 2022 from corresponding International patent application No. PCT/DE2022/200079.

* cited by examiner

METHOD FOR EVALUATING WHEEL SENSOR SIGNALS, ASSEMBLY FOR SAID METHOD, AND BRAKE SYSTEM COMPRISING SAID ASSEMBLY

CROSS-REFERENCE TO RELATED APPLICATIONS

This application is a national stage application, filed under 35 U.S.C. § 371, of International Patent Application No. PCT/DE2022/200079, filed on Apr. 28, 2022, which claims priority to German patent application No. 10 2021 212 324.4, filed on Nov. 2, 2021, each of which is incorporated by reference.

TECHNICAL FIELD

The technical field relates to a method for evaluating wheel sensor signals, an assembly for evaluating wheel sensor signals, and a braking system including the assembly.

BACKGROUND

In electronic brake systems, 3-level wheel sensors with VDA (Association of Automobile Manufacturers standard) AK protocol are currently used. A magnetic encoder wheel is located on the wheel of the vehicle.

As the wheel rotates, the change in the magnetic field is detected by the sensor and the sensor sends a wheel sensor protocol as shown in FIG. 1.

This protocol consists of a 28 mA speed pulse (start pulse), followed by further sensor data that is encoded in the following 14 mA pulses (protocol pulses, see FIG. 1).

When the vehicle is stationary, the sensor sends a standstill protocol at regular intervals, in which the 28 mA speed pulse is replaced by a 14 mA pulse at the beginning of the protocol (see FIG. 2).

In the electronic control unit, the wheel sensor signals are evaluated by a system consisting of a microcontroller (MCU) and a mixed signal ASIC (PCU) (FIG. 3).

The wheel sensor is directly connected to the PCU and sends the sensor protocol.

As the vehicle moves, the 28 mA pulses are detected by the PCU and transmitted directly to the MCU via the pin ASO (Active Sensor Output) without delay.

In the future, high-resolution wheel sensors will be used, the properties of which are intended especially for use at low speeds in order to determine the wheel and vehicle position as precisely as possible.

Without changing the magnetic encoder currently used, these sensors provide additional information about the current wheel position because the sensor resolution is increased (see FIG. 4a).

With these high-resolution sensors, each incoming data protocol would be evaluated in the low speed range, since the magnetic position is encoded in the additional protocols as additional information.

This is ensured, for example, if the software reads the protocol registers in the PCU often enough. As an alternative, these additional protocols could also be equipped with a start pulse. This is shown, for example, in DE102015213572A1 (see FIG. 4b and FIG. 5). In this variant additional protocol data is provided, but here the 28 mA pulse of the normal speed pulses is extended to include a further standby protocol with a 21 mA pulse height, which ensures the additional sensor resolution. This makes it possible to distinguish clearly which pulses are used to determine the speed and which are used for the additional resolution of distance and speed. These pulses could be forwarded to the MCU in any desired form. This would be implemented, for example, as an OR operation with the 28 mA pulses or as a separate ASO line.

However, the disadvantage of the OR operation is that the information as to the protocol (normal wheel sensor protocol or additional protocol) from which the ASO pulse actually originates is lost. However, the additional protocols are not available in all speed ranges. It is therefore no longer possible to clearly distinguish between pulse trains that have been generated with and without additional protocols.

A further disadvantage here is that the receiver module has to decode an additional current threshold, which means additional hardware complexity, as follows: A separate ASO line for 21 mA pulses requires additional pins on the PCU and MCU, new functions for decoding in the PCU, and additional connections on the printed circuit board. Additional pins with timer function are also required in the MCU. In addition, noise suppression becomes more demanding. This solution therefore seems too expensive and costly.

In another variant (see FIG. 4c and FIG. 6), the additional protocols have a 28 mA pulse exactly like the normal RAD protocols. This means that both location and wheel speed can be detected with higher resolution.

Even with the normal AK protocol, the protocol data must be shortened at high speeds, otherwise the protocols would run into each other. If this protocol is used continuously, the protocol data would be completely lost at high speeds and even the 28 mA pulses could converge. Changing over the number of speed pulses at a certain speed would also be problematic, as it can never be effected precisely due to component tolerances and therefore leads to unwanted uncertainty in the software evaluation.

Thus, there is an opportunity, in addition to the previous speed pulses, to introduce high-resolution sensor protocols can be detected directly in the MCU and their timing evaluated correctly with as little outlay as possible, e.g., in terms of cables between the MCU and PCU and additional timers in the MCU.

SUMMARY

In one embodiment, a method for evaluating wheel sensor signals of a wheel speed sensor is presented. The wheel speed sensor includes a first processor unit and a second processor unit, wherein the wheel sensor signals comprise at least one first protocol and a second protocol, and wherein the first protocol comprises a first start pulse and first protocol pulses, and the second protocol comprises a second start pulse and second protocol pulses. The first processor unit is connected to the second processor unit via an ASO interface. The method includes:

generating a magnetic field with a magnetic encoder wheel and sensing the magnetic field as wheel sensor signals from the wheel speed sensor, transmitting the protocols of the wheel sensor signals from the wheel speed sensor to the first processor unit, evaluating each transmitted protocol by the first processor unit and determining whether it is a first protocol or a second protocol, generating a pulse-width modulated ASO signal with a first length from the first start pulse, in the case of a first protocol, generating a pulse-width modulated ASO signal with a second length from the second start pulse in the case of a second protocol, transmitting the pulse-modulated ASO signal from the first processor unit to the second processor unit via the ASO interface, and evaluating the ASO signal with the second processor unit to ascertain whether it is an ASO signal from a first start pulse or an ASO signal from a second start pulse, by determining whether the ASO signal has a first length or a second length.

By utilizing the method described above, a complete picture of wheel position and wheel rotational speed is obtained even at low speeds. This provides better knowledge of the movement and position of the car. This is particularly relevant for automated parking.

In addition, there is no need to install new cables and no need to change the hardware. For example, no additional timers are required. In addition, even the use of a tire deflation detection system (DDS) or TPMS (Tire Pressure Measurement System) is possible without the use of a tire pressure sensor, even at lower vehicle speeds.

In one embodiment, the second processor unit recognizes the pulse-width modulated ASO signal as a rising edge on the ASO interface and provides the ASO signal with a time stamp. This ensures that the signal receives the correct time priority in order to be correctly correlated with other signals later on.

In one embodiment, the wheel sensor signals provided by the sensor are formed as current signals and are converted from the current signal into a voltage signal by the first processor unit.

In one embodiment, the second start pulses, first protocol pulses and second protocol pulses provided by the sensor have the same current level and the first start pulses have a different current level. The current level of the first start pulses may be 28 mA. The current level of the second start pulses, the first protocol pulses and the second protocol pulses may be 14 mA. Thus, the pulses can be distinguished from each other.

In one embodiment, the first length of the ASO signal from the first start pulse is twice as large as the second length of the ASO signal from the second start pulse. Thus, it is possible to reliably distinguish between the two lengths.

In one embodiment, an SPI interface is provided. The first and second protocol pulses are stored in the first processor unit and read out by the second processor unit via the SPI interface. Not all protocol pulses need to be read.

In one embodiment, the ASO signals transmitted via the ASO interface are detected by the second processor unit with at least one internal timer and the time of the ASO signals as well as the time interval between the ASO signals are determined.

An assembly for evaluating wheel sensor signals is also presented. The assembly includes a wheel speed sensor, an ASO interface, a first processor unit, and a second processor unit, the assembly being designed to carry out the method described above. The assembly may be utilized for operation in a brake system of a motor vehicle.

BRIEF DESCRIPTION OF THE FIGURES

Further embodiments may be realized from the subclaims and the description of exemplary embodiments on the basis of figures that follows.

In each case, schematically.

DETAILED DESCRIPTION

Figure 1:
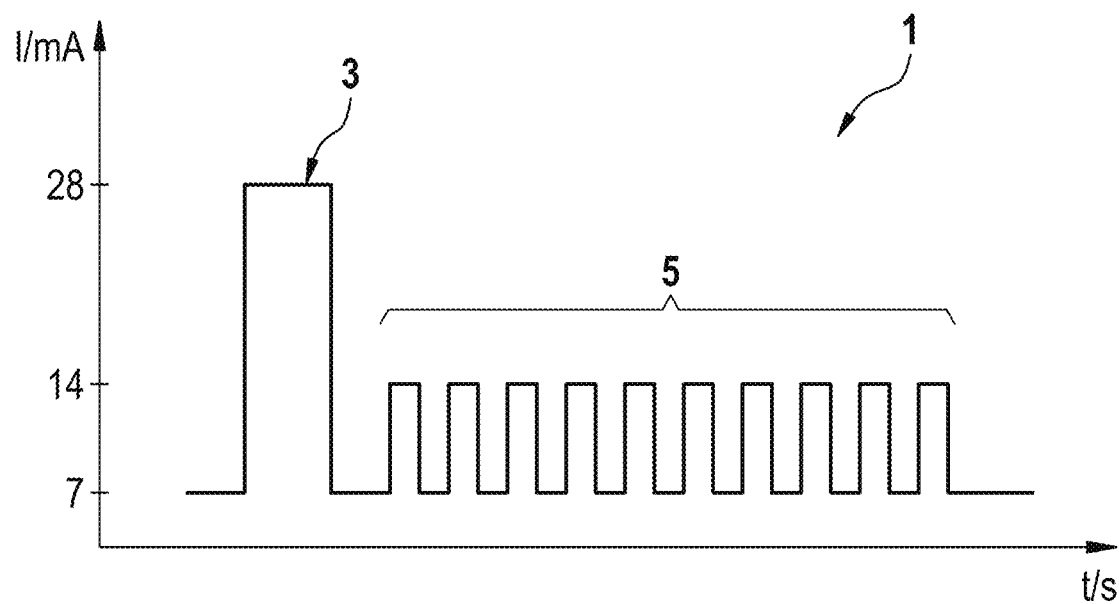
FIG. 1: shows a wheel sensor protocol with a speed pulse of 28 mA according to the prior art.

FIG. 1 shows a first wheel sensor protocol 1 with a first start pulse 3 and first protocol pulses 5 according to the prior art. The first start pulse 3 has a current strength of 28 mA and the protocol pulses 5 have a current of 14 mA.

Figure 2:
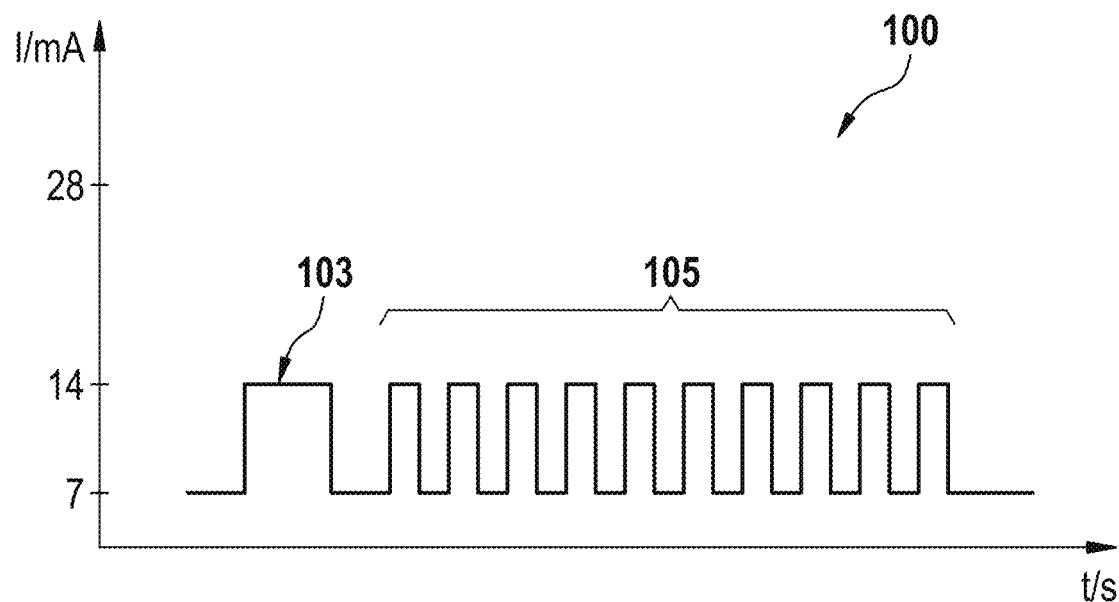
FIG. 2: shows a wheel sensor protocol at a standstill according to the prior art.

FIG. 2 shows a standstill protocol 100 with a standstill start pulse 103 and standstill protocol pulses 105 according to the prior art. Both the standstill start pulse 103 and the standstill protocol pulses 105 have a pulse height of 14 mA.

Figure 3:
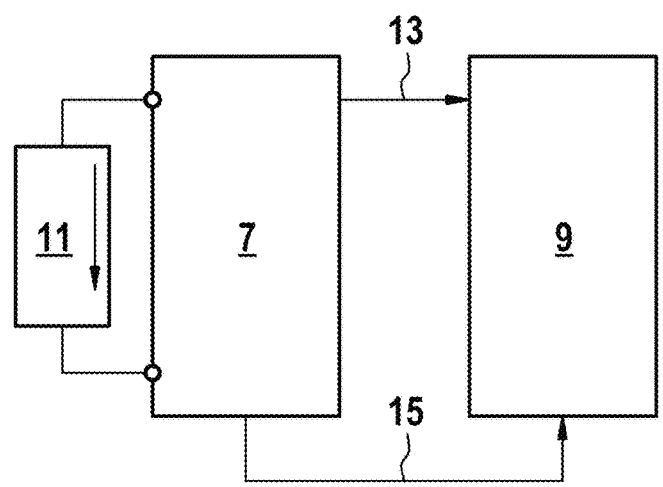
FIG. 3: show a system consisting of a wheel sensor, PCU and MCU according to the prior art.

FIG. 3 shows a system comprising a first processor unit 7 and a second processor unit 9, wherein the first processor unit 7 is connected to a wheel speed sensor 11. The wheel speed sensor 11 sends the sensor protocols to the first processor unit 7. The second processor unit 9 may be a microprocessor and the first processor unit may be a "mixed signal ASIC". The first processor unit 7 and the second processor unit 9 are connected to each other via an ASO interface 13 and an SPI interface 15. If the vehicle is moving, the 28 mA pulses are detected by the first processor unit 7 and transmitted directly to the second processor unit 9 via the ASO interface 13 without a time delay.

Figure 4A:
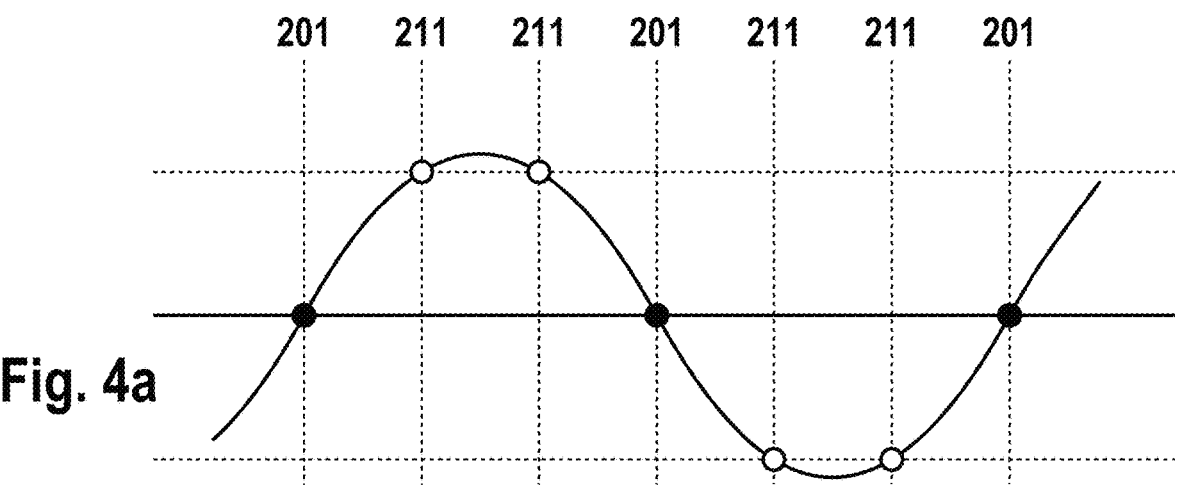
FIG. 4a: shows additional sampling points by means of a high-resolution sensor.

FIG. 4a shows the sampling over time (X-axis) with a first protocol 201 (black circles) and the additional sampling with a second protocol 211 sensor (white filled circles).

Figure 4B:
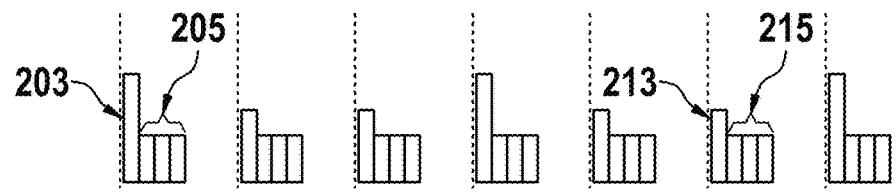
FIG. 4b: shows sensor protocols with additional standby protocols and a start pulse of 21 mA.
Figure 5:
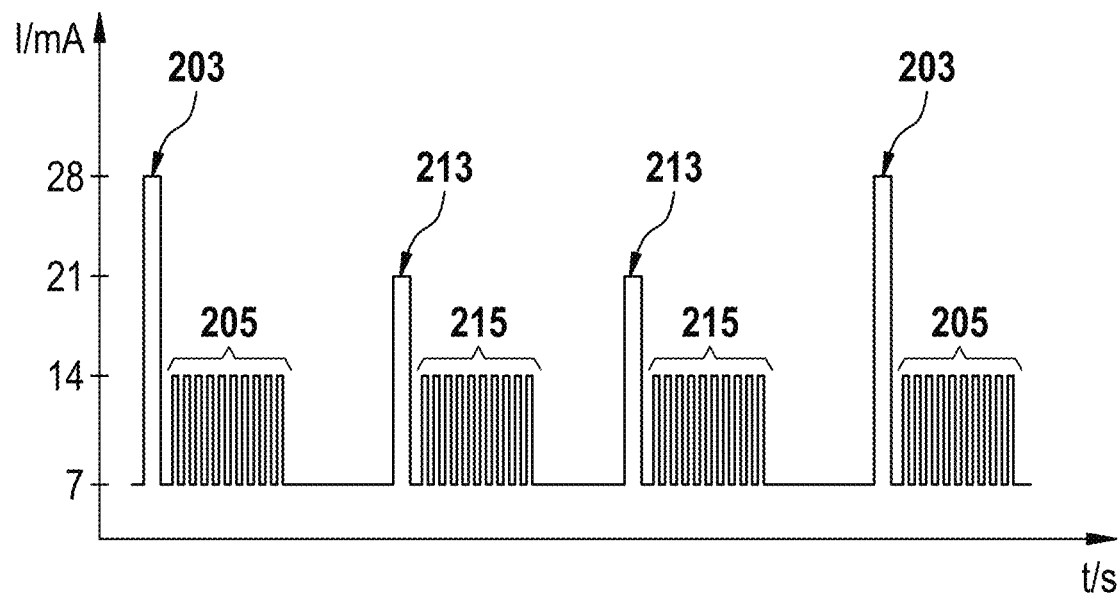
FIG. 5: shows a further view of sensor protocols with additional standby protocols and a start pulse of 21 mA.

FIGS. 4b and 5 show a first variant with additional samples. In this variant, the first protocols 201 have start pulses 203 of 28 mA and associated protocol pulses 205 of 14 mA. In addition, the 28 mA pulse of the normal speed pulses (start pulses 203) is extended here by a second protocol 211 (start pulses 213 with 21 mA pulse height and protocol pulses 215 with 14 mA), which enables the additional sensor resolution to be achieved. A disadvantage of this is that the receiver module has to decode an additional current threshold, which means additional hardware complexity. This solution is therefore too expensive and complex.

Figure 4C:
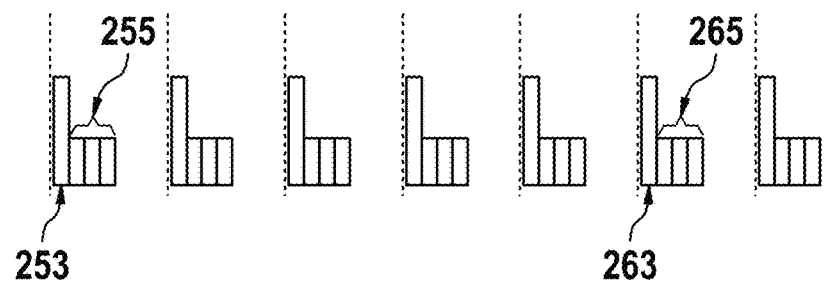
FIG. 4c: shows sensor protocols with additional standby protocols and a start pulse of 28 mA.
Figure 6:
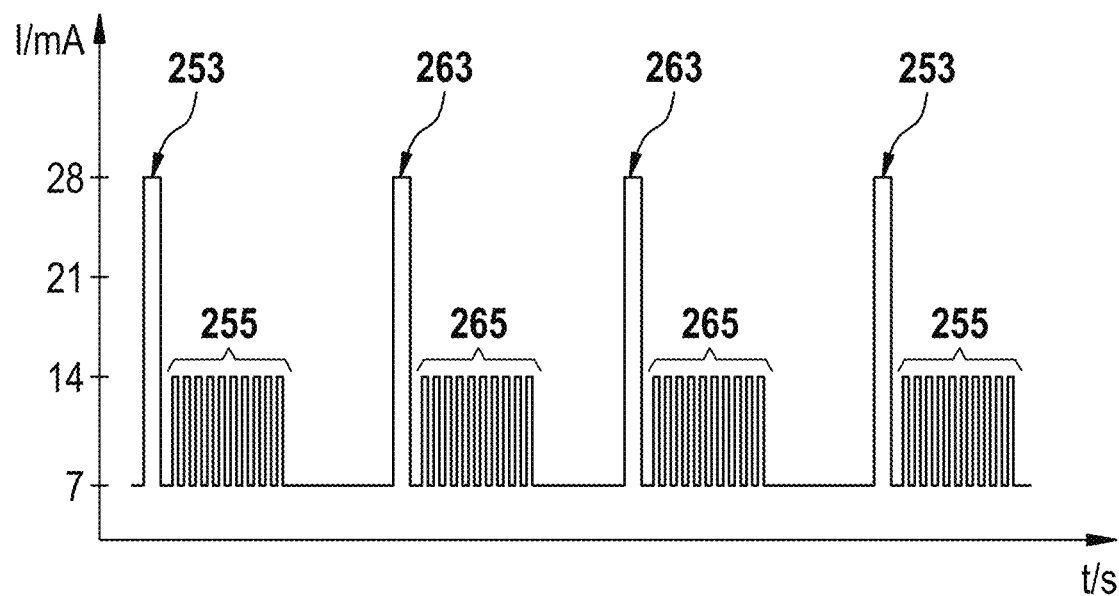
FIG. 6: shows a further view of sensor protocols with additional standby protocols and a start pulse of 28 mA.

FIGS. 4c and 6 show a second variant with additional samples. In this variant, the first protocols 201 have start pulses 253 of 28 mA and associated protocol pulses 255 of 14 mA. In addition, additional protocol data is supplied (second protocol 211), namely with start pulses 263 of likewise 28 mA and associated protocol pulses 265 of 14 mA. This achieves the additional sensor resolution. A disadvantage of this variant is that changing the number of speed pulses at a certain speed would also be problematic, as it can never be effected precisely due to component tolerances and therefore leads to unwanted uncertainty in the software evaluation.

So far, the first processor unit 7 (PCU) forwards the 28 mA speed pulse almost unchanged to the second processor unit 9 (MCU). The duration of the ASO signal is exactly the same length as the 28 mA pulse of the wheel sensor protocol and is not changed by the PCU 7.

Despite the use of high-resolution wheel sensors, the additional information cannot be fully used in the system at present. The transmission of the additional protocol data via the SPI interface 15 is too slow and its timing too inaccurate compared to the transmission with the ASO signal. This is not sufficient to improve functions such as ABS/ESP or passive tire pressure detection. For these system functions, exact timing information about the incoming pulses is required, which at present is only obtained via the timer on pin ASO 13.

In modern tire monitoring systems (indirect TPMS systems, DDS Deflation Detection System) not only is the relative change of the rolling circumference of the wheels evaluated, but an oscillation analysis is also performed to detect a long-term loss of air pressure of all four wheels due to diffusion. However, due to the accuracy requirements of the Fourier transform analysis, this function is only available for vehicle speeds>40 km/h. If additional "speed" pulses were available during slow driving, this function could also be implemented at lower speeds. In the sensor concept with the protocols according to FIG. 7b, the current wheel position is encoded in the data of the additional protocols (313, 315).

It is proposed that the PCU 7 itself evaluates the received wheel sensor protocol and, depending on the received signal shape, modulates or codes the ASO signal in some form in order to transfer information about the received wheel sensor protocol directly via the ASO line 13 to the second processor unit 9 (MCU).

The variant proposed is thus a pulse-width modulation of the ASO signal: If a normal speed pulse arrives, the length of the signal on ASO remains unchanged. If high-resolution, additional sensor protocols are received, the length of the ASO pulse is changed.

Figure 7A:
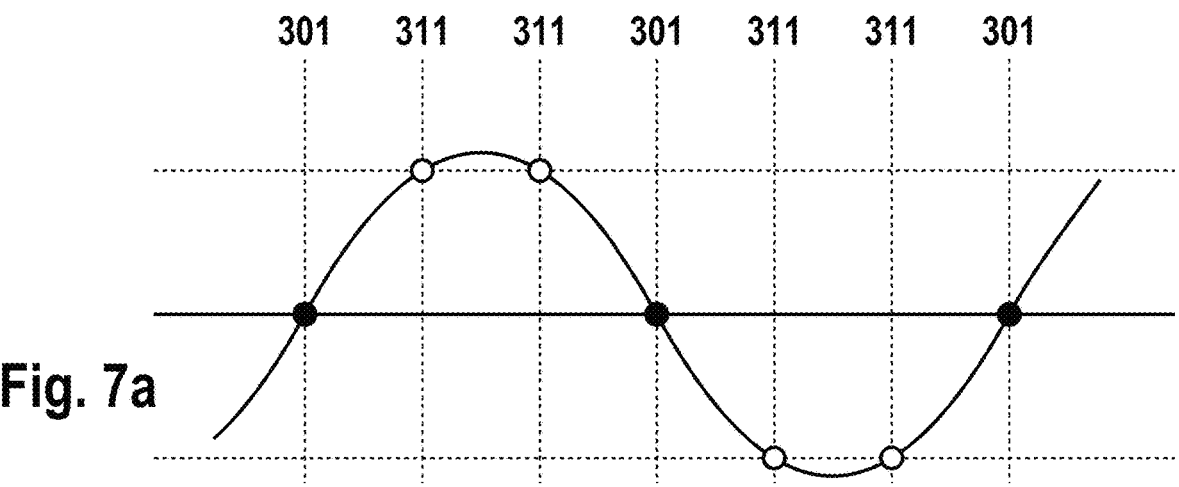
FIG. 7a: shows additional sampling points utilizing a high-resolution sensor (equivalent to FIG. 4a)
Figure 7B:
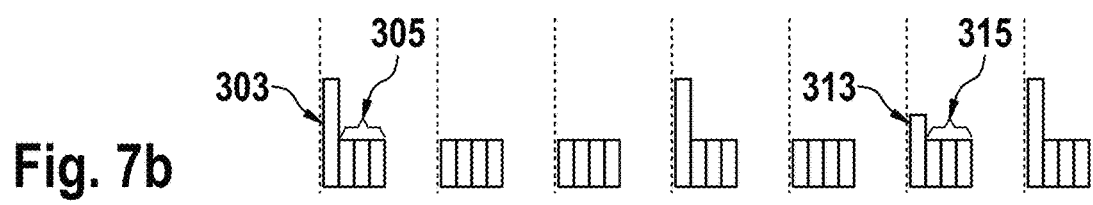
FIG. 7b: shows sensor protocols with additional standby protocols and a start pulse of 14 mA according to one embodiment.
Figure 7C:
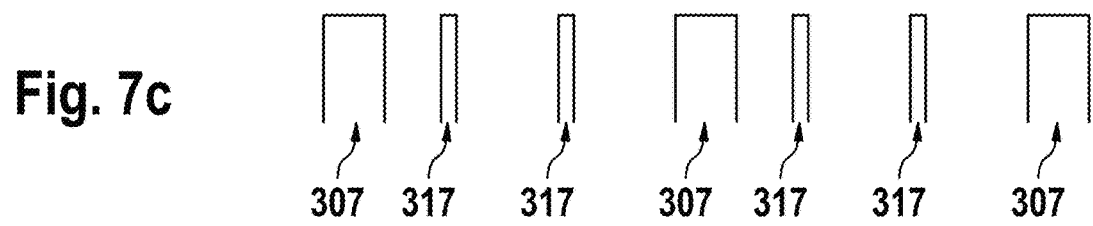
FIG. 7c: shows the pulse-width modulated signals on the ASO interface according to one embodiment and based on the sensor protocols from FIG. 7b, FIG. 8: shows a further view of sensor protocols with additional standby protocols and a start pulse of 14 mA according to the one embodiment (see also FIG. 7b).
Figure 8:
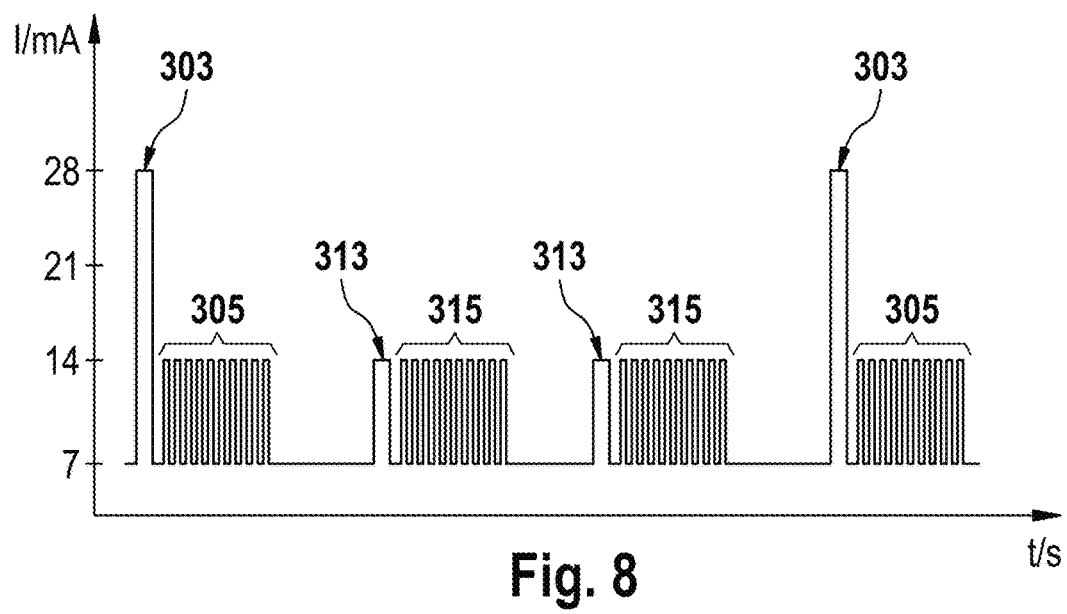

FIGS. 7 and 8 show protocols according to the disclosure. FIG. 7b shows a first protocol 301 with a first start pulse 303 of 28 mA and first protocol pulses 305. In addition, a second protocol 311 with a second start pulse 313 and second protocol pulses 315 is shown, which represent additional samples and wherein in these additional samples a start pulse 313 with a height of 14 mA is used. The height of 14 mA corresponds to the height of the protocol pulses 305, 315.

Based on these sensor protocols 301, 311, a pulse-width modulation of the signal which is to be transmitted via the ASO interface 13 is carried out. This can be seen in FIG. 7b. For protocols 301 starting with a 28 mA start pulse 303, an ASO signal with a first length 307 is generated, while for protocols 311 with a 14 mA start pulse 313, an ASO signal with a second length 317 is generated.

The second processor unit 9 detects whether the signal has a first length 307 or a second length 317. This allows a distinction to be made between a first protocol 301 and a second protocol 311. Accordingly, the data can be further processed. Whenever it makes sense to do so, the associated protocol pulses 305, 315 can be queried via the SPI interface 15 and correlated with the start pulses 303, 313.

The MCU 9 detects a new pulse with the rising edge at pin ASO (ASO interface 13) and provides it with a time stamp. This enables correct time measurement. The duration of the pulse obtained by the falling pulse edge determines whether it is a normal speed pulse (first protocol 301) or a high-resolution pulse (second protocol 311).

In the VDA AK protocol, the duration of the speed pulse (first length 307 from first protocol 301) is 50 μs+/−20%. When high-resolution sensor protocols arrive, an ASO signal (second length 317 from second protocol 311) with a duration of 25 μs is sent in order to be able to distinguish it clearly from the speed pulse (first protocol 301).

Together with the protocol data 305, 315 read out via SPI 15, the software then has a complete picture of the wheel position and wheel speed at its disposal, even at low wheel rotation speeds. The MCU 9 may evaluate all pulses of the high-resolution wheel sensors with the correct time information and use them for system functions.

The current circuit consisting of MCU 9, PCU 7 and wheel sensor 11 can thus be advantageously retained. New connections are not necessary. Only the logic within the PCU 7 needs to be changed to support the new function. The MCU timers are evaluated exclusively by software functions. No new hardware components are required.

This enables a particularly cost-effective extension of the functionality with regard to high-resolution wheel speed sensors and the system functions based on them.

In a variant according, additional protocols similar to the standby protocols are sent while driving (see FIGS. 7 and 8). This increases the resolution of the wheel sensor, since more accurate position data (white filled circles in FIG. 7a) are now supplied between the individual speed pulses (black filled circles in FIG. 7a). The current sensor position between the speed pulses is coded in the protocol data 305, 315.

The software reads this protocol data 305, 315 from the PCU 7 at regular time intervals in such a way that all path increments can be counted.

To do this, the magnetic position from which the increment originates is encoded in the sensor protocol.

Due to the solution described herein, tire pressure monitoring is now also possible at slow speeds.

The invention claimed is:

1. A method for evaluating wheel sensor signals of a wheel speed sensor, the sensor including a first processor unit and a second processor unit, wherein the wheel sensor signals include a first protocol and a second protocol, and wherein the first protocol includes a first start pulse and first protocol pulses, and the second protocol includes a second start pulse and second protocol pulses, and the first processor unit is connected to the second processor unit via an ASO interface, and wherein the method comprises:
    generating a magnetic field with a magnetic encoder wheel and sensing the magnetic field as wheel sensor signals from the wheel speed sensor;
    transmitting the protocols of the wheel sensor signals from the wheel speed sensor to the first processor unit;
    evaluating each transmitted protocol with the first processor unit to determine whether it is a first protocol or a second protocol;
    generating a pulse-width modulated ASO signal with a first length from the first start pulse in the case of a first protocol;

generating a pulse-width modulated ASO signal with a second length from the second start pulse in the case of a second protocol;

transmitting the pulse-modulated ASO signal from the first processor unit to the second processor unit via the ASO interface; and evaluating the ASO signal with the second processor unit to ascertain whether it is an ASO signal from a first start pulse or an ASO signal from a second start pulse by determining whether the ASO signal has a first length or a second length.

2. The method as set forth in claim 1, wherein the second processor unit recognizes the pulse-width modulated ASO signal as a rising edge on the ASO interface and provides the ASO signal with a time stamp.

3. The method as set forth in claim 1, wherein the wheel sensor signals provided by the wheel speed sensor are formed as current signals and the method further comprises: converting the wheel sensor signals from the current signal to a voltage signal with the first processor unit.

4. The method as set forth in claim 1, wherein the wheel sensor signals provided by the wheel speed sensor are current signals, wherein the second start pulses, first protocol pulses, and second protocol pulses provided by the wheel speed sensor have the same current level and the first start pulses have a different current level.

5. The method as set forth in claim 4, wherein the current level of the first start pulses is 28 mA and that the current level of the second start pulses, the first protocol pulses, and the second protocol pulses is 14 mA.

6. The method as set forth in claim 1, wherein the first length of the ASO signal from the first start pulse is twice as large as the second length of the ASO signal from the second start pulse.

7. The method as set forth in claim 1, wherein an SPI interface is provided and the method further comprises:
storing the first and second protocol pulses in the first processor unit; and
reading the first and/or second protocol pulses via the SPI interface by the second processor unit.

8. The method as set forth in claim 1, further comprising:
detecting the ASO signals transmitted via the ASO interface with at least one internal timer by the second processor unit; and
determining the time of the ASO signals and the time interval between the ASO signals.

9. An assembly for evaluating wheel sensor signals generated by a wheel speed sensor, wherein the wheel sensor signals include a first protocol and a second protocol, and wherein the first protocol includes a first start pulse and first protocol pulses, and the second protocol includes a second start pulse and second protocol pulses, said assembly comprising:

a first processor unit communicable with the wheel speed sensor and configured to a second processor unit; and an ASO interface connecting the first processor unit to the second processor unit;

said first processor unit configured to
receive the protocols of the wheel sensor signals from the wheel speed sensor;
evaluate each transmitted protocol to determine whether it is a first protocol or a second protocol,
generate a pulse-width modulated ASO signal with a first length from the first start pulse in the case of a first protocol,
generate a pulse-width modulated ASO signal with a second length from the second start pulse in the case of a second protocol, and
transmit the pulse-modulated ASO signal to the second processor unit via the ASO interface; and said second processor unit configured to evaluate the ASO signal with the to ascertain whether it is an ASO signal from a first start pulse or an ASO signal from a second start pulse by determining whether the ASO signal has a first length or a second length.

10. A brake system for a motor vehicle comprising an assembly for evaluating wheel sensor signals generated by a wheel speed sensor, wherein the wheel sensor signals include a first protocol and a second protocol, and wherein the first protocol includes a first start pulse and first protocol pulses, and the second protocol includes a second start pulse and second protocol pulses, said assembly comprising:

a first processor unit communicable with the wheel speed sensor and configured to
a second processor unit; and
an ASO interface connecting the first processor unit to the second processor unit;
said first processor unit configured to
receive the protocols of the wheel sensor signals from the wheel speed sensor;
evaluate each transmitted protocol to determine whether it is a first protocol or a second protocol,
generate a pulse-width modulated ASO signal with a first length from the first start pulse in the case of a first protocol,
generate a pulse-width modulated ASO signal with a second length from the second start pulse in the case of a second protocol, and
transmit the pulse-modulated ASO signal to the second processor unit via the ASO interface; and
said second processor unit configured to evaluate the ASO signal with the to ascertain whether it is an ASO signal from a first start pulse or an ASO signal from a second start pulse by determining whether the ASO signal has a first length or a second length.

* * * * *